United States Patent [19]
Raj et al.

[11] Patent Number: 5,237,521
[45] Date of Patent: Aug. 17, 1993

[54] HIGH RESOLUTION POSITION MEASUREMENT SYSTEM

[75] Inventors: Guru B. Raj, Fairport; Dennis Marus, Rochester; Robert M. Lofthus, Honeoye Falls; Lawrence P. Lavery, Fairport; Vincent M. Williams, Palmyra; Charles F. Evans, Rochester; Stuart A. Schweid, Henrietta, all of N.Y.

[73] Assignee: Xerox Corporation, Stamford, Conn.

[21] Appl. No.: 933,969

[22] Filed: Aug. 24, 1992

Related U.S. Application Data

[63] Continuation of Ser. No. 569,808, Aug. 20, 1990, abandoned.

[51] Int. Cl.$^5$ .................. G03G 15/00; G01P 3/481
[52] U.S. Cl. .................................. 364/561; 364/565; 377/18
[58] Field of Search ............... 364/561, 565, 550, 182; 377/1, 3, 15, 16, 17, 18, 20, 23; 209/552, 540; 355/207, 212; 324/78 R, 76.11–77.11

[56] References Cited

U.S. PATENT DOCUMENTS

| | | | |
|---|---|---|---|
| 4,162,443 | 7/1979 | Beasley et al. | 324/78 D |
| 4,165,170 | 8/1979 | Donohue et al. | 355/212 X |
| 4,224,568 | 9/1980 | Griner | 324/78 D |
| 4,239,957 | 12/1980 | Satoh et al. | 377/18 X |
| 4,251,869 | 2/1981 | Shaffer | 364/484 |
| 4,434,470 | 2/1984 | Thomas et al. | 364/565 |
| 4,485,452 | 11/1984 | Cording et al. | 377/23 X |
| 4,621,224 | 11/1986 | Watabe et al. | 364/182 X |
| 4,639,884 | 1/1987 | Sagues | 364/565 |
| 4,698,828 | 10/1987 | Hiramoto | 377/3 |
| 4,716,535 | 12/1987 | Yashida et al. | 364/565 |
| 4,974,238 | 11/1990 | Kobayashi et al. | 377/16 |
| 4,989,222 | 1/1991 | Lutts et al. | 364/561 X |

Primary Examiner—Thomas G. Black
Assistant Examiner—Michael Zanelli

[57] ABSTRACT

A system for determining the cumulative position and periodic average velocity of a rotating body having an incremental encoder, operatively connected to the body, for generating a series of periodic signals indicative of rotation of the body. The system also includes a high frequency clock for generating clock pulses at a frequency greater than the maximum frequency of the encoder signal, and a timer for controlling the total time of a predetermined sample interval. Also included in the device is a counter for accumulating the number of integral encoder signal cycles that have been completed, an arithmetic logic unit for determining the size of a fractional portion of an encoder signal cycle that was completed between the last integral encoder cycle and the end of the sample interval. Subsequently, the number of integral encoder signal cycles is added to the fractional portion of an encoder cycle to determine the total number of encoder signal cycles completed, whereby the total is then multiplied by an encoder position conversion factor to determine the cumulative position of the rotating body or belt driven therefrom.

7 Claims, 4 Drawing Sheets

HIGH RESOLUTION POSITION MEASUREMENT SYSTEM

This is a continuation division of application Ser. No. 569,808, filed Aug. 20, 1990, now abandoned.

BACKGROUND OF THE INVENTION

1. Field of the Invention

The present invention relates generally to the determination of the rotary position and velocity of a rotating apparatus, and more specifically to the accurate determination of the position of a xerographic photoreceptor belt being driven by a rotating drive roller having a low resolution encoder attached thereto.

2. Description of the Prior Art

In the measurement of position and velocity of rotating elements, such as drive rollers for a xerographic photoreceptor belt, it is common practice to utilize encoders to monitor the position of the rotating element. In general, however, the accuracy of the positional information is limited to the resolution of the encoder used. It is also generally known that in order to increase the accuracy of the positional information more expensive, high resolution encoders must be employed. Moreover, the same high resolution encoders are required to accurately determine the velocity of a rotating element.

Other methods of characterizing the motion of a rotating element are disclosed in the following references. For example, U.S. Pat. No. 4,716,535 to Yoshida et al. discloses a speed detection apparatus for detecting the speed of a rotary machine, or any mechanism which generates pulses at a frequency proportional to its speed. The speed detection apparatus comprises a pulse generator for generating signal pulses proportional to the speed of the machine; a sampling interval setting unit; a counting unit for counting signal pulses generated by the pulse generator in accordance with a sampling interval; and a calculating unit for determining the speed of the machine.

U.S. Pat. No. 4,639,884 to Sagues discloses a combination of hardware and microprocessor driven software for measuring the rotary velocity of a servo shaft driven by a motor. A square wave signal is produced according to the rotation of the shaft, while a high speed clock produces a large number of clock pulses in order to count transitions of the square wave. The total number of transitions of the square wave during a selected time period is divided by the total number of clock pulses during the same period in order to determine the velocity of the shaft.

U.S. Pat. No. 4,162,443 to Brearly et al. discloses a method and apparatus for measuring the frequency of a pulse signal generated by a transducer which may be used to sense engine speed. The frequency of the pulse signal is measured by counting the number of complete pulse cycles and measuring the fractional value of any incomplete pulse cycle occurring during a fixed sampling period. The number of complete pulse cycles and the fractional value of any incomplete pulse cycle are summed to obtain a total number of pulses during the sampling period. The fractional value of pulse cycles during the sampling period is determined using a clock pulse signal having a base frequency, where the total number of clock pulse signals occurring during a complete cycle increase in proportion to the number of complete cycles within a sampling period. A computer divides the number of clock pulses occurring during the fractional cycle by the frequency corrected number of clock pulses occurring during the previous complete cycle to determine the fractional value and enabling calculation of the speed.

U.S. Pat. No. 4,224,568 to Griner discloses a method for measuring the number of full and fractional cycles of a periodically time varying signal during a fixed sampling period. The end fractional cycle occurring during a sampling period is measured by (1) counting the number of clock pulses occurring during the last full cycle of the sampling period; and (2) counting the the number of clock pulses occurring between the end of the last full cycle in the sample period and the end of the sample period. The number of clock pulses counted in (1) is divided by the number of clock pulses counted in (2) to determine the end fractional cycle. The end fractional cycle is also used, by subtracting it from unity, to estimate a front fractional cycle which will be summed in the subsequent sampling period to determine the total number of cycles occurring in the sampling period.

U.S. Pat. No. 4,251,869 to Shaffer discloses a frequency-to-binary converter, operable in conjunction with a digital computer, which measures a square wave signal to determine its frequency during a fixed time interval. The number of completed wave periods within the time interval are measured, and the number of fractional wave periods are also calculated. Given the whole and fractional periods, the computer calculates the wave frequency according to a programmed equation.

In general, the references cited above disclose systems suitable for determination of the instantaneous velocity or frequency of a system having a characteristic output signal that varies periodically with time. Generally, these system are suitable for providing feedback to a velocity control system that would then alter the drive motor velocity until the measured velocity was within an acceptable range of the target drive motor velocity. The references cited above disclose systems which provide instantaneous velocity feedback. Unfortunately, such a system does not provide feedback information relating to the positional change of the rotating element being monitored, other than the positional change that occurred over the most recent sampling interval. As an example, if the rotating body were temporarily halted, a velocity-only feedback system, as cited in the references, would detect a decrease in velocity and signal only the detected decrease in velocity. Having velocity-only feedback, the control system would respond by signaling the drive motor to increase velocity until the appropriate velocity was once again reached. However, such a system would not have any indication of the relative position differential caused by the momentary stoppage of rotation and, therefore, could not be used to control the motor in an effort to regain the lost distance.

In a xerographic system, it is necessary to monitor and control not only the velocity of the photoreceptor belt, but also the relative position of the belt, via the associated drive roll, to assure that the belt is advancing in the required manner. A velocity-only feedback system would provide no indication of the position of the belt and would, therefore, be unacceptable. Fortunately, a position-velocity feedback system would provide the necessary information to control the velocity and position of the photoreceptor belt.

It is therefore an object of the present invention to provide a system capable of determining the position of a rotating body, or element driven therefrom, in a highly accurate manner and to utilize the positional information to determine the velocity of the rotating body. It is a further object of the present invention to utilize a low or moderate resolution encoder attached to such a body to enable the high accuracy determination of the body's position. It is another object of the present invention to reduce the positional error built up within a sampling type monitoring system by cumulatively tracking the position of the rotating body over all sampling intervals. It is a final object of the present invention to utilize such a positional tracking system to monitor the position and velocity of a belt driven photoreceptor in order to accurately monitor and control the xerographic processes operatively associated with latent images formed thereon.

Further advantages of the present invention will become apparent as the following description proceeds and the features characterizing the invention will be pointed out with particularity in the claims annexed to and forming a part of this specification.

SUMMARY OF THE INVENTION

A feedback device for determining the cumulative position and periodic average velocity of a rotating element having an incremental encoder, for generating a periodic signal indicative of rotation, operatively connected to the rotating element, a clock for generating clock pulses at a frequency above the maximum frequency of the encoder signal, and a timer for controlling the total time of a sample interval. Also included is a counter for accumulating the number of integral encoder signal cycles that have been completed, a partial cycle measurement means for determining the size of a fractional portion of an encoder signal cycle that was completed between the last integral signal cycle and the end of the sample period. The number of integral encoder signal cycles is added to the fractional portion of an encoder cycle to determine the total number of encoder signal cycles completed, which is indicative of the position of the rotating element. In addition, the feedback device is also capable of determining the average velocity of the rotating element over the most recently completed signal period.

BRIEF DESCRIPTION OF THE DRAWINGS

For a better understanding of the present invention, reference may be had to the accompanying drawings wherein the same reference numerals have been applied to like parts and wherein.

DESCRIPTION OF THE PREFERRED EMBODIMENT

Figure 1:
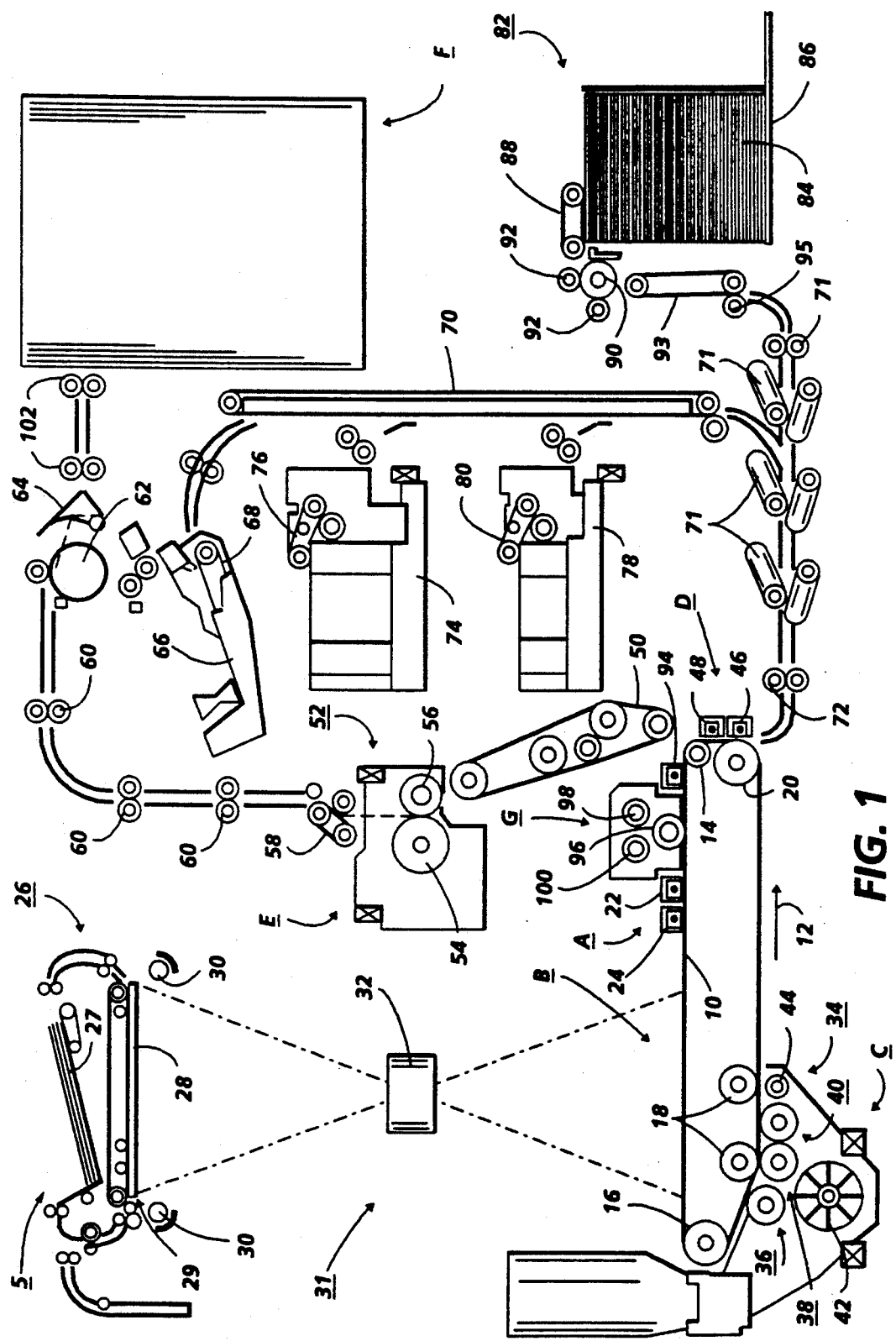
FIG. 1 is a schematic elevational view depicting various operating components and subsystems of a xerographic reproduction machine incorporating the present invention.

For a general understanding of the features of the present invention, reference is made to the drawings. Referring to FIG. 1, there is shown a typical xerographic reproduction machine 5 composed of a plurality of programmable components and subsystems which cooperate to carry out a copying or printing job. The machine employs a photoconductive belt 10, which is entrained about stripper roller 14, tensioning roller 16, idler rollers 18, and drive roller 20. Drive roller 20 is rotated by a conventional motor (not shown) coupled thereto by suitable means such as a belt drive. Drive roller 20 is also operatively connected to a shaft encoder having a resolution of 100 lines/revolution, whereby the belt position and velocity are tracked via signals from the encoder. As roller 20 rotates it advances belt 10 in the direction of arrow 12 through the various processing stations disposed about the path of movement thereof.

Initially, the photoconductive surface of belt 10 passes through charging station A where corona generating devices, indicated generally by the reference numerals 22 and 24, charge photoconductive belt 10 to a relatively high, substantially uniform potential. Next, the charged photoconductive belt is advanced through imaging station B. At imaging station B, a document handling unit 26 sequentially feeds documents from a stack of documents in document tray 27 into registered position on platen 28. Xenon flash lamps 30 mounted in optics cavity 31 illuminate the document on platen 28, the light rays reflected from the document being focussed by lens 32 onto belt 10 to expose an electrostatic latent image on photoconductive belt 10 which corresponds to the informational areas contained within the document currently registered on platen 28. After imaging, the document is returned to document tray 27 via a simplex copy path or if the first pass of a duplex copy is being made via a duplex path.

The electrostatic latent image recorded on photoconductive belt 10 is developed at development station C by a magnetic brush developer unit 34 having developer roll assemblies 36, 38 and 40. A paddle wheel 42 picks up developer material and delivers it to the developer roll assemblies 36, 38. Developer roll assembly 40 is a cleanup roll while magnetic roll 44 is provided to remove any carrier granules adhering to belt 10.

Following development, the developed image is transferred at transfer station D to a copy sheet provided via de-skew rollers 71 and paper feed roller 72. There, the photoconductive belt 10 is exposed to a pre-transfer light from a lamp (not shown) to reduce the attraction between photoconductive belt 10 and the toner powder image. Next, a corona generating device 46 charges the copy sheet to the proper magnitude and polarity so that the copy sheet is tacked to photoconductive belt 10 and the toner powder image attracted from the photoconductive belt to the copy sheet. After transfer, corona generator 48 charges the copy sheet to the opposite polarity to detack the copy sheet from belt 10.

Following transfer, a conveyor 50 advances the copy sheet bearing the transferred image to fusing station E where a fuser assembly, indicated generally by the reference numeral 52 permanently affixes the toner powder image to the copy sheet. Preferably, fuser assembly 52 includes a heated fuser roller 54 and a pressure roller 56 with the powder image on the copy sheet contacting fuser roller 54.

After fusing, the copy sheets are fed through a decurler 58 to remove any curl. Forwarding rollers 60 then advance the sheet via duplex turn roll 62 to gate 64 which guides the sheet to either finishing station F or to duplex tray 66, the latter providing an intermediate or buffer storage for those sheets that have been printed on one side and on which an image will be subsequently printed on the second, opposed side thereof. The sheets are stacked in duplex tray 66 face down on top of one another in the order in which they are copied.

To complete duplex copying, the simplex sheets in tray 66 are fed, in seriatim, by bottom feeder 68 back to transfer station D via conveyor 70, de-skew rollers 71 and paper feed rollers 72 for transfer of the second toner powder image to the opposed sides of the copy sheets. The duplex sheet is then fed through the same path as the simplex sheet to be advanced to finishing station F.

Copy sheets are supplied from a secondary tray 74 by sheet feeder 76 or from auxiliary tray 78 by sheet feeder 80. Sheet feeders 76, 80 are friction retard feeders utilizing a feed belt and take-away rolls to advance successive copy sheets to transport 70 which advances the sheets to rolls 72 and then to transfer station D.

A high capacity feeder 82 is the primary source of copy sheets. Tray 84 of feeder 82, which is supported on an elevator 86 for up and down movement, has a vacuum feed belt 88 to feed successive uppermost sheets from the stack of sheets in tray 84 to a take away drive roll 90 and idler rolls 92. Rolls 90, 92 guide the sheet onto transport 93 which in cooperation with idler roll 95, de-skew rollers 71 and paper feed rollers 72 move the sheet to transfer station D.

After transfer station D, photoconductive belt 10 passes beneath a corona generating device 94 which charges any residual toner particles remaining on belt 10 to a polarity conducive to their removal from photoconductive belt 10. Thereafter, a pre-charge erase lamp (not shown), located inside photoconductive belt 10, discharges the photoconductive belt in preparation for the next charging cycle. Residual particles are removed from belt 10 at cleaning station G by an electrically biased cleaner brush 96 and two de-toning rolls 98 and 100.

Figure 2:
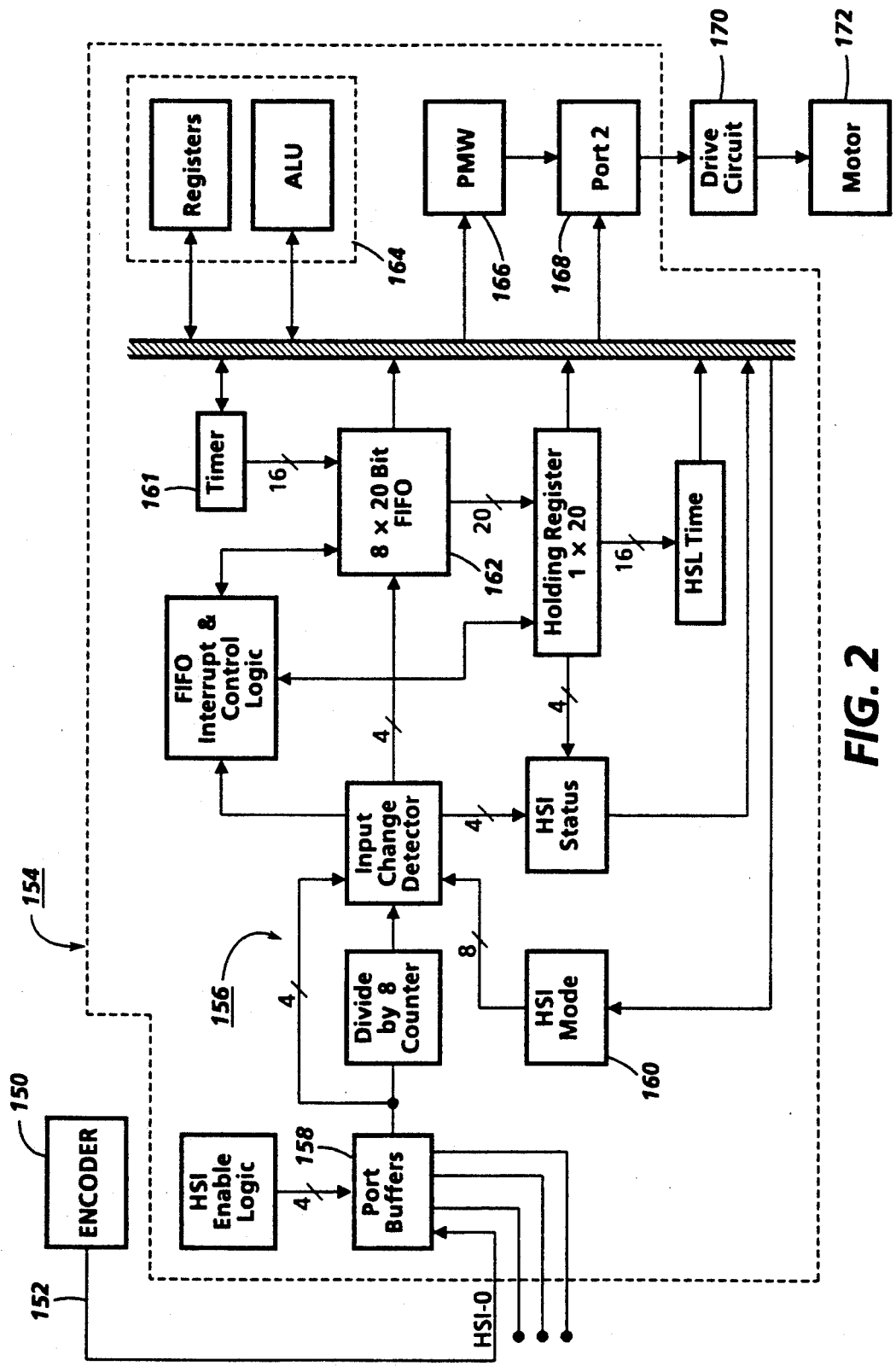
FIG. 2 is a block diagram of the electrical components of the present invention.

Referring now to FIG. 2, which displays the electrical components used to implement the present invention, encoder 150 transmits an alternating signal, via line 152 to microcontroller (μC) 154. Microcontroller 154, preferably an Intel 8096 ® (16-bit embedded microcontroller), having a High Speed Input (HSI) unit, generally referred to by reference numeral 156, receives the signal on pin HSI0 of port 158. HSI unit 156, having been previously programmed, through HSI_MODE register 160, to detect the rising edge of the encoder signal on line 152, records the presence of the rising edge and the time of the occurrence as determined from timer 161. Timer 161 is driven by the microcontroller clock (not shown) which is in turn driven by an external crystal oscillator, for example a 12 MHz crystal which is subsequently divided to produce a 2 microsecond clock pulse. The 4-bit HSI state and 16-bit time are saved in FIFO 162. Concurrently, the background processing of CPU 164 is interrupted so that the CPU may handle the encoder interrupt. CPU 164 is generally understood to include an arithmetic logic unit (ALU) and a plurality of registers for the execution of arithmetic operations. Furthermore, background processing might normally include control of the pulse width modulator (PWM) unit 166 of the microcontroller. PWM 166 is used to output a control signal via Port 2, generally referred to by reference numeral 168, to motor drive circuit 170, which directly drives motor 172. Output of the PWM is regulated in response to feedback from the system of the present invention, providing feedback of the position of the drive roll, as well as the velocity. It should be noted that the control of motor 172 is not a requirement of the present invention, rather, it is presented as one probable background task that could be executed by the microcontroller.

Figure 3B:
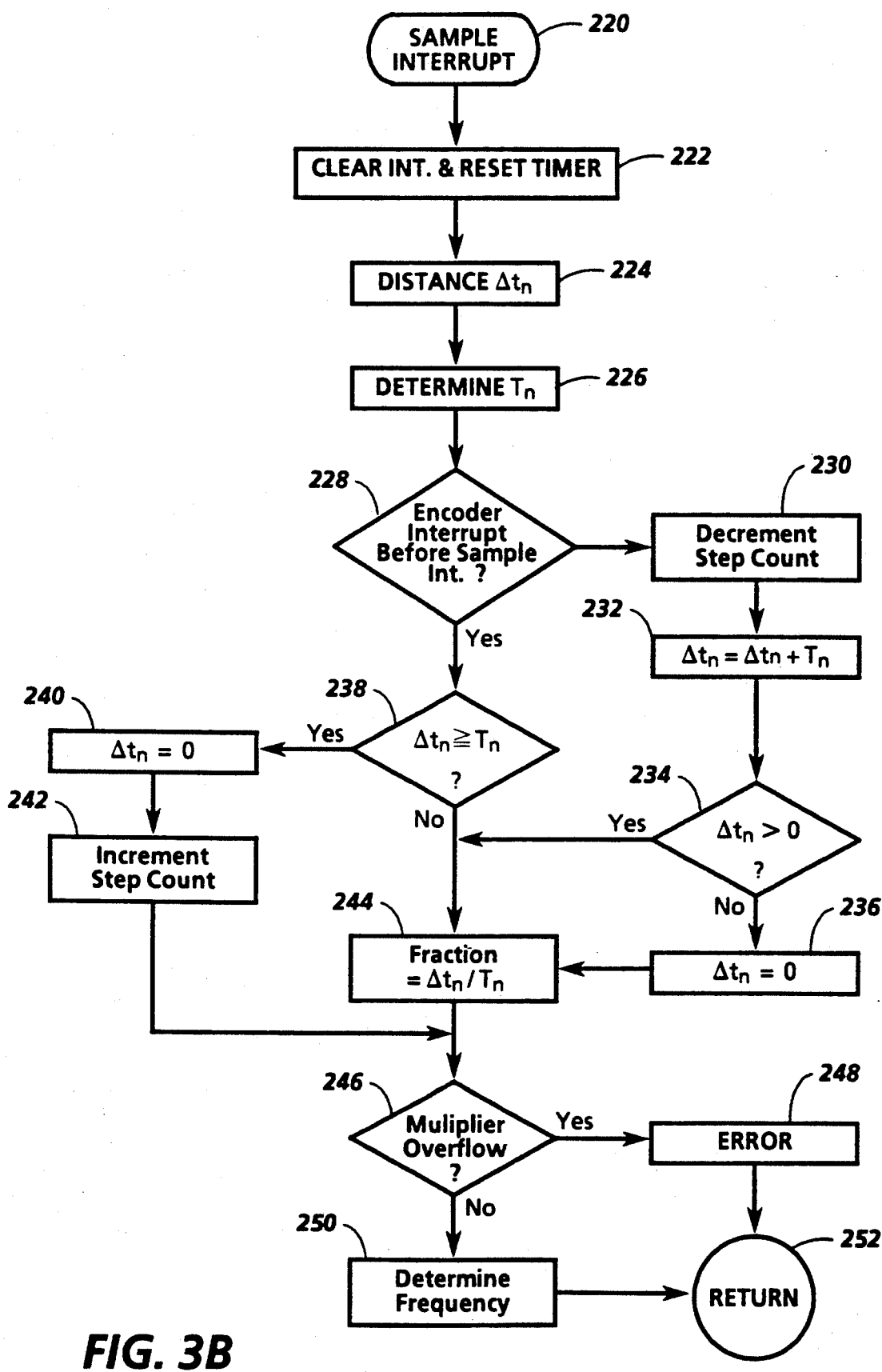
FIG. 3b is a representative flow diagram, depicting the processing steps associated with the sample time interrupt of the present invention, which is further represented by the code listing of Appendix A.
Figure 3A:
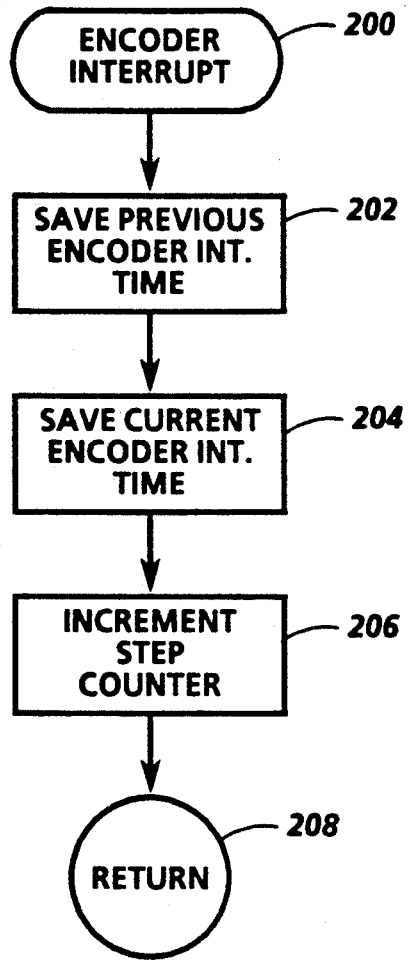
FIG. 3a is a representative flow diagram, depicting the processing steps associated with the encoder interrupt of the present invention.
Figure 4:
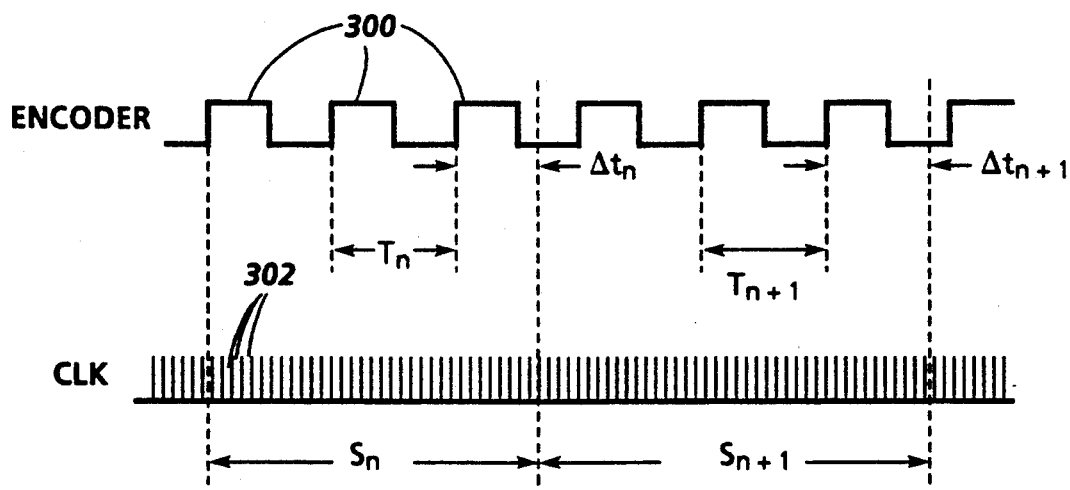
FIG. 4 is an illustrative timing diagram, displaying typical timing signals that are encountered in a system used to monitor rotational position in accordance with the present invention.

Referring also to FIG. 3a, which depicts the encoder interrupt processing steps, the encoder interrupt process is invoked upon detection of each encoder signal rising edge 300, of FIG. 4. CPU 164 begins processing the interrupt when triggered by the HSI unit, block 200. The following instructions are executed during the interrupt process of FIG. 4:

```
10  LD ENC_PREV_RISING_TIME, ENC_RISING_TIME
11  LD ENC_RISING_TIME, HSI_TIME_IMAGE
12  INC ENC_INTEGER
13  RET
```

Initially, the CPU loads the previously stored HSI interrupt time, ENC_RISING_TIME, into the ENC_PREV_RISING_TIME register variable, line 10 and block 202. Subsequently, the CPU saves the time of the current encoder interrupt, HSI_TIME_IMAGE, at line 11 and block 204. The CPU then increments the ENC_INTEGER register variable, line 12 and block 206 to record the occurrence of the encoder interrupt and the corresponding change in position of the encoder. Finally, the CPU returns to the interrupted background task to continue processing, line 13 and block 208.

Referring now to FIG. 3b in conjunction with Appendix A and FIG. 4, FIG. 3b illustrating the processing steps contained in the assembly code listing of Appendix A, the CPU is interrupted by a software timer upon expiration of a predefined sample period, block 220. Initially, the CPU clears the interrupt and resets the timer to start the next sample period, block 222. Next, the elapsed portion of the current encoder period ($\Delta t_n$) is determined by subtracting the most recent encoder interrupt time, ENC_RISING TIME, from the current sample interrupt time, INTERRUPT_TIME, to determine ENC_POS_FRA or $\Delta t_n$, block 224 and line 30. Next, the CPU determines the time period of the last complete encoder cycle, represented by $T_n$ and ENC_PERIOD, at block 226 and line 31. At block 228 the CPU executes a test, line 33, to verify that the most recent encoder interrupt happened before the sample time interrupt. If not, the ENC_POS_FRA value will be negative and the CPU will branch to block 230, line 40, where the encoder step count, ENC_POS_INT, will be decremented and the time of the complete encoder cycle, ENC_PERIOD will be added to the ENC_POS_FRA value to arrive at a new $\Delta t_n$, block 232. Subsequently, the new $\Delta t_n$ value, or ENC_POS_FRA, is tested at block 234 to assure that the new value is a positive number. If the new $\Delta t_n$ value is not positive, the value is set to zero, block 236 and line 44, and in either case processing continues at block 244.

If the encoder interrupt occured before the sample time interrupt, as tested by block 228, the CPU will execute an additional test at block 238 to determine if the ENC_POS_FRA or $\Delta t_n$ value is larger than the last complete encoder cycle time $T_n$ (ENC_PERIOD). If so, processing continues at block 240, where the ENC_POS_FRA or $\Delta t_n$ value is set to zero, block 240 and line 37, and the encoder step count, ENC_POS_INT will be incremented at block 242 or line 38.

If the test at block 238 indicates that $\Delta t_n$ is less than $T_n$, processing will continue at block 244 and line 45, where the elapsed time of the incomplete encoder cycle is first multiplied by a frequency conversion factor, ENCODER_MULT, and then divided by the time of the last complete encoder cycle $T_n$ (ENC_PERIOD). The resulting value is then saved in the ENC_POS_FRA register variable.

Prior to determining the current belt position, the CPU executes a test at block 246, line 49, to assure that the multiplication operation in line 54 will not result in an overflow condition. If the number of encoder steps, determined by subtracting the previous number of encoder steps, ENC_PREV_POS_INT from the current encoder step count, ENC_POS_INT, line 48, is greater than the quotient of the maximum positive integer value (32767) divided by the frequency conversion factor ENCODER_MULT, then the multiplication at line 54 would result in an overflow condition. Should the number of encoder steps exceed this quotient, the system will declare an error, block 248 and line 51, prior to returning to the background task.

Assuming that the positional fraction has been determined and the multiplication will not result in an overflow condition, the average frequency of encoder pulses during the sample interval is determined at block 250, starting at line 53. In the present implementation, the average frequency is compared to a desired frequency that is defined by a desired photoreceptor belt velocity. The conversion and comparison operations are executed as part of the background motor control process executed by the microcontroller. First, the number of complete encoder steps is converted to a frequency, line 54, by multiplying the number of steps by the frequency conversion factor, ENCODER_MULT. Subsequently, the average frequency ENC_INC_POS is determined by adding the integer and fractional frequency values together, respectively held in registers AXW and CXW. This calculation enables the feedback of the drive roll encoder frequency, so that the CPU may control the speed and position of the drive roll accordingly. Finally, the current values are stored for future reference, lines 57 and 58, interrupt processing is completed at block 252, line 59, and the CPU is allowed to return to the interrupted background control processes. The register variables now contain updated encoder feedback information, ENC_POS_INT, representative of the cumulative number of encoder cycles and encoder frequency information, ENC_INC_POS, which is an average frequency of encoder cycles over the last sample interval. These values may then be processed by the microcontroller in the background to determine the cumulative belt position and speed, thereby enabling the microcontroller to accurately control the drive motor.

Referring now specifically to FIG. 4, which depicts a timing diagram having two typical sampling periods indicated as $S_n$ and $S_{n+1}$, the length of the sampling period $S_n$ may be varied to suit the system requirements for positional data. The frequency of clock pulses 302, is a function of the resolution of the encoder, the maximum rotational speed of the drive roller and the desired resolution of the monitoring system. If the roller is rotating at a speed of 360 rpm and the encoder resolution is 100 lines/revolution, a 6 MHz clock will yield a system capable of providing an effective encoder resolution of approximately 25,600 lines/revolution.

It is therefore evident that the present invention is capable of monitoring the position of a rotating body in a highly accurate manner, using a low resolution encoder. Moreover, the present invention has no positional error accumulation, a characteristic generally associated with sampling type position monitoring systems. This is achieved by tracking position or, more specifically, the number of encoder cycles, in a cumulative fashion over an extended number of sampling intervals. The present invention, therefore, enables the highly accurate feedback of encoder cycle frequency and cumulative cycle completion data, to enable the xerographic system to measure and control the motion and position of the photoreceptor belt.

While there has been illustrated and described what is at present considered to be a preferred embodiment of the present invention, it will be appreciated that numerous changes and modifications are likely to occur to those skilled in the art, and it is intended to cover in the appended claims all those changes and modifications which fall within the true spirit and scope of the present invention.

APPENDIX A
SAMPLE_TIME EQU 2000 ;(period in usec)
ENCODER_MULT EQU 10000/(SAMPLE_TIME(100)

```
30  SAMPLE_INT:
    SUB ENC_POS_FRA,INTERRUPT_TIME, ENC_RISING_TIME
31  SUB ENC_PERIOD,ENC_RISING_TIME,ENC_PREV_RISING_TIME
32  LDB ENC_POS_INT, ENC_INTEGER
33  ENC_INC_POSITION:
    CMP_ENC_POS_FRA, #00
34  BLT ENC_FRACT_NEG
35  CMP ENC_POS_FRA, ENC_PERIOD
36  BLT ENC_FRACT_NO_OVER
37  ENC_FRACT_OVER:
    CLR ENC_POS_FRA
38  INCB ENC_POS_INT
39  BR CALC_ENC_POS
40  ENC_FRACT_NEG:
    DECB ENC_POS_INT
41  ADD ENC_POS_FRA, ENC_PERIOD
42  CMP ENC_POS_FRA, #00
43  BGT ENC_FRACT_NO_OVER
44  CLR ENC_POS_FRA
```

```
                         APPENDIX A
         SAMPLE_TIME EQU 2000  ;(period in usec)
         ENCODER_MULT EQU 10000/(SAMPLE_TIME(100)
45  ENC_FRACT_NO_OVER:
    MULU AXL, ENC_POS_FRA, #ENCODER_MULT
46  DIVU AXL, ENC_PERIOD
47  LD ENC_POS_FRA, AXW
48  CALC_ENC_POS:
    SUBB AXLB, ENC_POS_INT, ENC_PREV_POS_INT
49  CMPB AXLB, #(32767/ENCODER_MULT)
50  BLT ENC_OK
51  SETBIT ERROR_STATUS
52  BR START_SHUTDOWN
53  ENC_OK:
    CLRB AXHB
54  MUL AXL, #ENCODER_MULT
55  SUB CXW, ENC_POS_FRA, ENC_PREV_POS_FRA
56  ADD ENC_INC_POS, AXW, CXW
57  LDB ENC_PREV_POS_INT, ENC_POS_INT
58  LD ENC_PREV_POS_FRA, ENC_POS_FRA
59  RET
```

We claim:

1. A measurement apparatus for determining the cumulative change in position of a known point on an endless belt, the belt having a cylindrical driving member disposed interior to and in frictional driving contact with the belt, comprising:

an encoder, operatively connected to said cylindrical driving member, for indicating incremental changes in the angular position of the cylindrical driving member during rotation thereof, wherein said incremental changes are indicated by an alternating signal;

means for generating a regular, periodic pulsed signal having a frequency greater than the maximum frequency of said alternating signal;

sample period determination means for establishing the beginning and end of successive sampling periods as regulated by a predetermined number of pulses from said pulsed signal generating means, said predetermined number of pulses being variable between successive sampling periods;

a cycle counter for cumulatively counting the number of complete cycles of said alternating signal occurring during all successive sampling periods;

means for calculating the fractional portion of a partial cycle of said alternating signal which occurs between an end of an immediately preceding, complete alternating signal cycle and the end of said sampling period;

means for summing said fractional portion of said partial cycle with the value of said cycle counter to determine a total number of cycles completed at the end of said sampling period;

means for determining the cumulative rotational displacement of said cylindrical driving member as a function of the total number of cycles completed at the end of said sampling period; and means for converting said cumulative rotational displacement into an equivalent linear displacement of the belt, wherein said linear displacement is indicative of the total displacement of the known point on the belt along a continuous path defined by the felt.

2. The measurement apparatus of claim 1, wherein the sample period determination means comprises:

a microcontroller further comprising;

a clock input which is responsive to said regular, periodic pulsed signals, and a timer, driven by said clock input, for interrupting the microcontroller at a predefined sample time.

3. The measurement apparatus of claim 1 wherein said means for calculating the fractional portion of a cycle comprises:

a counter for counting the number of regular, periodic pulsed signals occurring during each complete cycle of said alternating signal;

means for storing a first value of said counter upon completion of each cycle;

counter reset means for resetting said counter upon completion of each cycle, subsequent to storing the value of said counter;

means for storing a second value of said counter at the end of said sampling period; and means for dividing said second value by said first value to determine said fractional portion of a cycle.

4. The measurement apparatus of claim 1, further comprising:

means for storing a first linear displacement value at the end of a first sampling period;

means for storing a second linear displacement value at the end of a second sampling period occurring after said first sampling period;

means for determining the time elapsed between the end of said first sampling period and the end of said second sampling period; and means for determining the average velocity of the belt by subtracting said first linear displacement value from said second linear displacement value and dividing the result by the elapsed time.

5. An apparatus for determining the velocity and cumulative position of a rotating element comprising:

an incremental encoder operatively connected to the rotating element for generating an alternating signal as a function of the rotation of the element through an established angle;

means for generating regular, periodic clock pulses at a frequency greater than the maximum frequency of the alternating signal;

means for establishing a beginning and an end of a sample interval based upon the periodic clock pulses, the time difference between the beginning and the end of the sample period thereby defining an elapsed sample time;

integral cycle measurement means for accumulating the number of integral encoder signal cycles completed during the sample interval;

means for counting the cumulative number of integral encoder signal cycles completed by the end of the sample interval, said cumulative encoder signal cycles being counted over a plurality of successive sample periods;

partial cycle measurement means for determining the fractional portion of an incomplete encoder signal cycle occurring between the last integral encoder signal cycle and the end of said sample interval;

first arithmetic means for adding said number of integral encoder signal cycles to said fractional portion of an encoder signal cycle and subtracting therefrom a fractional portion of an encoder signal cycle determined at the end of a preceding sample interval to determine the total number of encoder signal cycles completed within said sample interval, and dividing the total number of encoder signal cycles by the elapsed sample time to determine the velocity of said rotating element; and second arithmetic means for adding the cumulative number of encoder signal cycles to said fractional portion of an encoder cycle to determine a sum thereof, and multiplying the sum by a conversion factor to determine the cumulative position of the rotating element at the end of said sampling interval.

6. The apparatus of claim 5 wherein said partial cycle measurement means comprises:

a counter for counting the number of regular, periodic clock pulses occurring during each integral encoder cycle;

means for storing the value of said counter in a first memory location upon completion of each integral encoder cycle;

means for resetting said counter upon completion of each integral encoder cycle;

means for storing the value of said counter in a second memory location at the end of said sampling interval; and means for dividing the value in said second memory location by the value in said first memory location to determine the fractional portion of the encoder cycle.

7. A method for determining the position of a portion of an endless belt being driven by a drive roll including the steps of:

a) monitoring the output of an encoder operatively attached to the drive roll to determine when an integral encoder cycle has been completed;

b) cumulatively counting the number of integral encoder cycles completed during a plurality of successive sampling periods;

c) counting the number of high frequency clock pulses that occur during each integral encoder cycle;

d) storing the number of high frequency clock pulses that have occurred during the most recent integral encoder cycle;

e) detecting the end of a current sample period, said current sample period determined as a predefined number of the high frequency clock pulses and thereby having a predefined elapsed time;

f) counting the number of high frequency clock pulses occurring between the last integral encoder cycle and the end of the current sample period;

g) dividing the number of high frequency clock pulses counted in step (f) by the number of high frequency clock pulses counted in step (c) to determine a quotient representative of the fractional portion of an encoder cycle completed at the end of the current sample period;

h) adding said number of integral encoder cycles counted in step (b) to said quotient determined in step (g) to arrive at a total number of encoder cycles; and i) multiplying said total number of encoder cycles by an encoder cycle distance to determine the position of the portion of the endless belt at the end of said current sampling period, the position being determined relative to a starting position established when the step of monitoring the encoder, step (a), was initiated.

* * * * *